(12) United States Patent
Powell

(10) Patent No.: US 12,509,102 B2
(45) Date of Patent: Dec. 30, 2025

(54) VEHICLE AND DRIVER RISK METER AND PUBLISHER

(71) Applicant: John Herbert Powell, Bowling Green, KY (US)

(72) Inventor: John Herbert Powell, Bowling Green, KY (US)

( * ) Notice: Subject to any disclaimer, the term of this patent is extended or adjusted under 35 U.S.C. 154(b) by 0 days.

(21) Appl. No.: 18/068,002

(22) Filed: Aug. 24, 2023

(65) Prior Publication Data

US 2025/0065898 A1 Feb. 27, 2025

(51) Int. Cl.
*B60W 50/14* (2020.01)
*B60W 40/09* (2012.01)

(52) U.S. Cl.
CPC ............ *B60W 50/14* (2013.01); *B60W 40/09* (2013.01); *B60W 2050/146* (2013.01); *B60W 2556/50* (2020.02)

(58) Field of Classification Search
CPC ................. B60W 50/14; B60W 40/09; B60W 2050/146; B60W 2556/50
See application file for complete search history.

(56) References Cited

U.S. PATENT DOCUMENTS

2015/0237062 A1\* 8/2015 Roytman ............ H04L 63/1433
726/25
2020/0391762 A1\* 12/2020 Raichelgauz .......... G08G 1/165

\* cited by examiner

*Primary Examiner* — Brian A Zimmerman
*Assistant Examiner* — Cal J Eustaquio
(74) *Attorney, Agent, or Firm* — Mark A. Pitchford; Charles Shull; Pitchford Fugett, PLLC

(57) ABSTRACT

Aspects of the present invention provide a dental practice management system including associated user interfaces and methods.

14 Claims, 4 Drawing Sheets

VEHICLE AND DRIVER RISK METER AND PUBLISHER

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

BACKGROUND OF THE INVENTION

The present invention relates generally to vehicle roadway systems.

There are unsafe and or aggressive drivers on our roadways. Unsafe or aggressive driving provides very little benefit for anyone, and, it increases risk of death, injury and property damage for everyone. Currently drivers are often able to create unsafe high risk traffic situations, if they choose to do so, without any consequences or penalty. Drivers often increase the risk of death, injury or property damage for other drivers. Previously, there have been hundreds of thousands of instances where someone's risky or wreck-less driving has caused the death or injury of innocent people. Aggressive or unsafe drivers are, in many cases, not held responsible for instances of additional risk they create for others on the road.

SUMMARY OF THE INVENTION

Aspects of the present invention provide a dental practice management system including associated user interfaces and methods.

In one aspect, a vehicle system includes a vehicle configured to be driven by a driver and a remote computer. The remote computer includes one or more memories storing computer executable instructions and one or more processors that, when executing the computer executable instructions, are configured to receive driver data sensed from one or more sensors on the vehicle, generate a driver score based on the sensed data, generate a risk meter based on the driver score, and output the risk meter to the driver and to a remote server, thereby publishing the risk meter so that the risk meter is viewable by other drivers. The risk meter comprises a graphical meter indicating an accumulated driving behavior of the driver. The one or more processors can be further configured to generate a driver profile and a vehicle profile. The one or more processors can be further configured to output the risk meter to the vehicle, causing the display of the vehicle to display the risk meter to the driver. The one or more processors can be configured to update the driver score by adding or subtracting percentage points based on the driving behavior of the driver.

In one aspect, a computer-implemented method is provided. The method includes receiving, by a remote computer, driver data sensed from one or more sensors on the vehicle, generating a driver score based on the sensed data, generating a risk meter based on the driver score, and outputting the risk meter to the driver and to a remote server, thereby publishing the risk meter so that the risk meter is viewable by other drivers.

In one aspect, a non-transitory computer-readable medium containing computer executable instructions that, when executed by one or more processors, cause the one or more processors to perform a method. The method includes receiving, by a remote computer, driver data sensed from one or more sensors on the vehicle, generating a driver score based on the sensed data, generating a risk meter based on the driver score, and outputting the risk meter to the driver and to a remote server, thereby publishing the risk meter so that the risk meter is viewable by other drivers.

In one aspect, the system is operable to cause drivers to be held more personally and financially responsible and accountable for most instances of risk they create for themselves and others while driving. To constantly and instantly expose each driver's driving methods (safe or unsafe) thereby decreasing risk of death, injury or property damage for all drivers. To constantly monitor, record, display and instantly publish, by means of the internet and other methods, the driving ways or methods and established driving habits (learned by this invention) of each driver and each vehicle. This invention constantly monitors and makes a record of all the driving activity of each driver and each vehicle including things such as location, speeds driven, routes driven, aggressive and defensive driving events, space management, observance traffic laws, braking reactions, safety usage, etc. In short, most all of the driving activity of each driver and each vehicle. To analyze, evaluate, assess and rate drivers responses and reactions to most all driving scenarios and events that might occur while driving. To reduce aggressive driving. To meter, rate and score each driver, based along with other factors, on the amount of risk they create or reduce. To meter, rate, and score each vehicle, based, along with other factors, on the amount of risk they create or reduce. To cause drivers to have incentives, including financial incentives, to drive safer voluntarily. To constantly and instantly display and publish, via the internet, information, data and ratings on each driver's driving methods. To constantly and instantly display and publish, via the internet, information, data and ratings on each vehicle's driving risk. To create for each driver an "earned" Personal Driving Score. To create for each vehicle a Vehicle Risk Score. To help train people to be safer drivers. To help prevent traffic accidents. To help prevent chain-reaction traffic accidents. To provide warnings to drivers that are approaching dangerous situations. To help prevent traffic jams. To help reduce traffic congestion. To help reduce tailgating. To instantly and constantly publish, via the internet, each driver's failure to observe or obey traffic laws. This feature is optional and can be enabled or disabled by some users. To help law enforcement agencies monitor traffic law violations. To provide and document an evidentiary record of all driving events encountered by a vehicle. To provide and document an evidentiary record of driving events leading up to a traffic accident. To constantly recognize and instantly publish, in real time, instances of drivers driving while impaired or fatigued. To help government agencies evaluate new drivers. To reduce unsafe driving. To help make us all better drivers. To gradually acclimate the general public to using this invention.

This invention constantly makes drivers personally and financially responsible and accountable for most of the instances of risk they create for themselves and others when driving by constantly monitoring, rating, recording and instantly publishing, via the internet, each driver's ways of driving. People being aware of the constant publication of their driving methods will be a powerful encouragement for people to drive safer voluntarily. Constant publishing of all drivers' driving characteristics should eventually cause the cost of driving risk (insurance) to be more evenly distributed among drivers thereby resulting in people having financial incentive to drive safer voluntarily.

This invention leaves the driving to the driver. This invention is not robotic. This invention does not intervene on (take over) a driver's driving. However, available driving intervention equipment on a vehicle can be enabled or activated or deactivated by this invention. This feature is optional and can be selected or disabled by certain users.

This invention does not infringe on anyone's freedom. This invention does not limit a driver's freedom. With this invention operating on their vehicle driver's are still free to speed, drive recklessly, or aggressively. They can drive however they want to drive. There are already traffic laws in place that make unsafe driving practices illegal. Drivers are already being monitored by law enforcement officers. This invention just does it more consistently. This invention makes drivers aware that their driving characteristics are constantly and instantly being made public. This awareness will be a powerful encouragement for drivers to drive safely and to obey traffic laws voluntarily. This invention makes it much harder for driver's to "get away" with breaking traffic laws.

People's driving (safe or unsafe) is constantly and instantly exposed to everyone by this invention thereby decreasing risk of death, injury or property damage for all drivers. Also, as an option, if selected by some users, this invention can make enforcement of traffic laws much easier and less expensive because it constantly and instantly exposes each driver's traffic law violation(s), via the internet, as compared to, physically monitoring roadways with expensive police officers in police cars. Drivers will be aware of the constant publication of their traffic law violations making drivers more inclined to obey traffic laws constantly instead of only when there is a police officer watching or present. This invention makes it much harder for driver's to "get away" with breaking traffic laws. Also, this will free up time for police officers to be spent on higher priority crimes.

This invention constantly recognizes and instantly publishes, in real time, instances of drivers driving while impaired or fatigued (DUI). Drivers knowing that their driving while impaired is being constantly recognized and instantly published will be a powerful encouragement for drivers to avoid (DUI) driving while impaired or fatigued voluntarily. More than 20% of traffic accidents involve some kind of impairment (drugs or alcohol) of the driver and the percentage is even higher among our young people.

This invention helps people reduce their aggressive driving attitude. This invention has programming designed to introduce and acclimate people to this invention so as to improve people's likelihood to use it effectively. In addition, this invention provides an evidentiary record or documented trail of driving events including those events leading up to a traffic accident. This invention constantly monitors and makes a record of all the activity of a vehicle including, things such as location, speeds driven, routes driven, aggressive and defensive driving events, space management, driver's braking reactions, location of each vehicle, and more. In short, a record of all phases of the driving activity of each vehicle, thereby documenting the circumstances leading up to a traffic accident or any other event.

One of the many great things that this invention will accomplish, due to the Driving Space Cushion Management programming within this invention, will be the reduction of the deadly chain-reaction traffic accidents that happen almost every day on our highways. Obviously, such a reduction would save many lives, prevent millions of injuries, save billions of dollars, not to mention the relief from traffic jams. These deadly and costly chain reaction accidents are most often the result of vehicles traveling very close to each other.

This invention has the capability, when enabled by certain users to do so, to reduce distractions from driving caused by cell phones by disabling the subject driver's hand held cell phone devise when driving while, at the same time, enabling many of that cell phone's functions or applications through hands free voice activation of the appropriate existing cell phone equipment on the vehicle. Any cell phone application that is considered detrimental to driving safety by this invention is redirected or disabled by this invention while driving.

This invention can evaluate, test and qualify or disqualify new drivers more completely, more effectively, more efficiently and at less cost. The US States can enter their chosen parameters for evaluating and testing new drivers.

BRIEF DESCRIPTION OF DRAWINGS

Reference will now be made in detail to optional embodiments of the invention, examples of which are illustrated in accompanying drawings. Whenever possible, the same reference numbers are used in the drawing and in the description referring to the same or like parts.

DETAILED DESCRIPTION OF THE INVENTION

Figure 1:
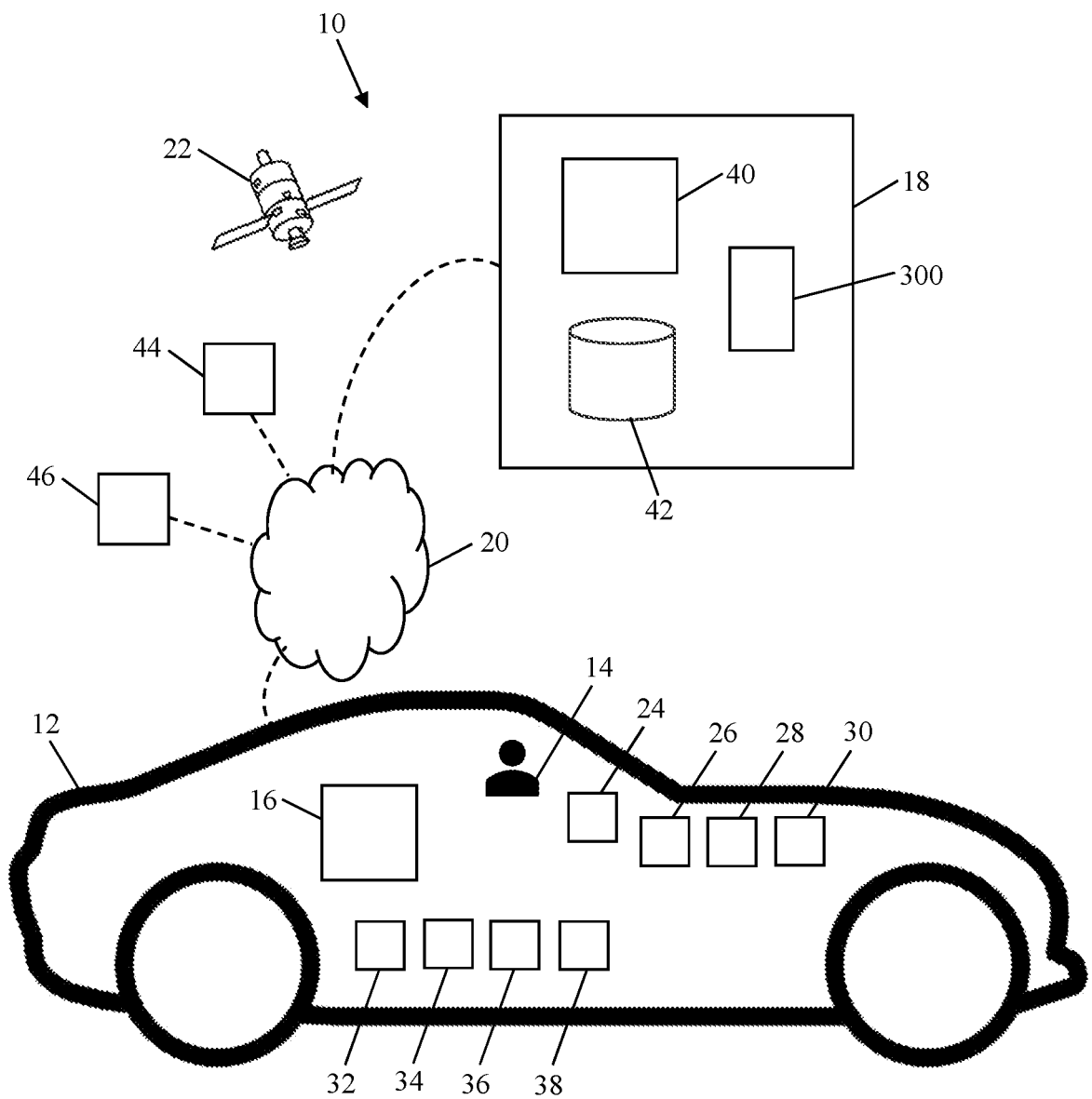
FIG. 1 is a schematic view of the vehicle system.

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not delimit the scope of the invention.

Referring to FIGS. 1-4, there is shown an embodiment of a vehicle system 10 for increasing the safety of roadways. The vehicle system 10 receives sensor data from one or more sensors of one or more vehicles 12, evaluates risk created or reduced by each vehicle 12 and each driver 14 based on the sensor data, map data, predetermined safety metrics, tolerances, and other data, and thereafter generates and outputs a risk gauge or meter 300, associated with a driver 12 and/or vehicle 12.

The vehicle system 10 generally includes a computer 16, a remote computer 18, such as a remote server, in communication with the computer 16 via a network 20 or satellite 22. The vehicle can comprise a display screen 24, instruments 26, a communications device including an internet connector 28 and a satellite connector 30, a GPS device 32, vehicle controls 34, e.g., brakes, accelerator, signals, etc., intervention equipment 36, and one or more sensors including accumulating devices and transmitters 38.

The remote computer 18 can include a control unit 40 one or more processors, a memory 42 including one or more archives or database, and the generated risk meter 300. The remote computer 18 can be in communication with one or more remote databases 44, such as Google Maps® or other map database, and one or more remote servers 46, which host websites as discussed in more detail below.

Figure 2:
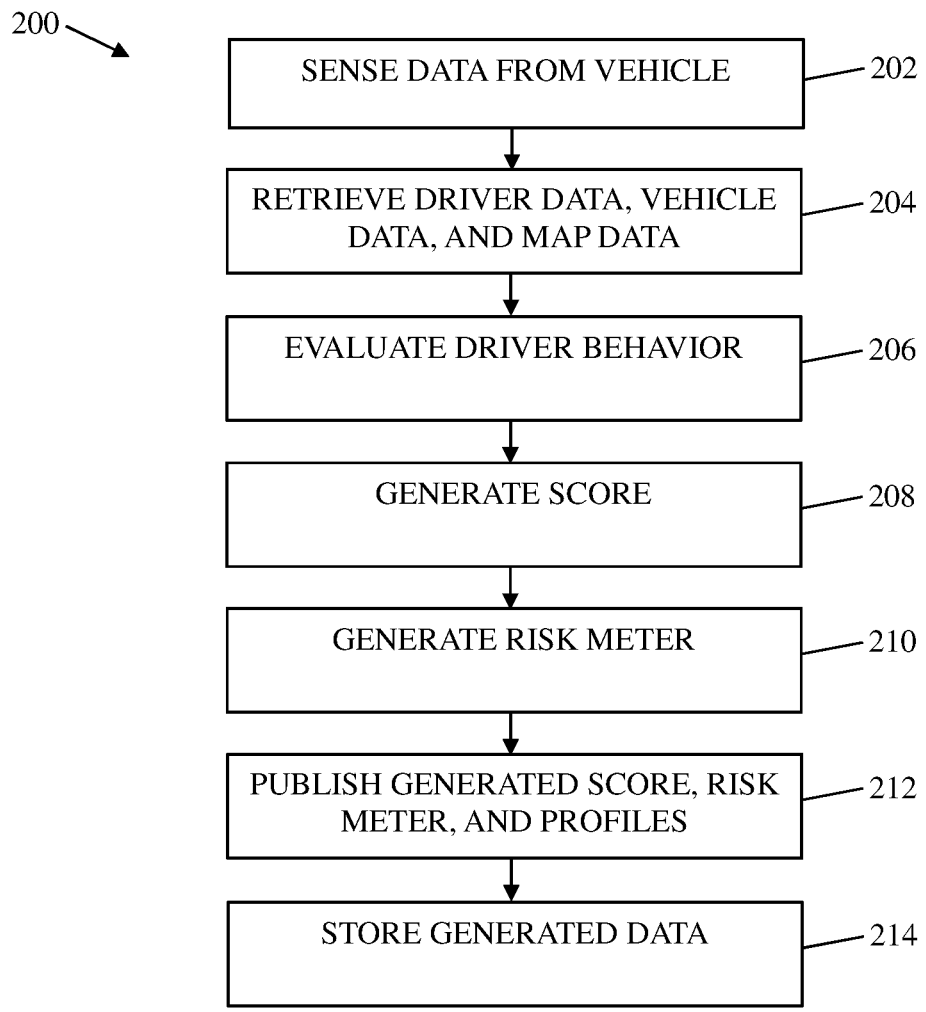
FIG. 2 is a flowchart of a method for operating the vehicle system.

Referring to FIG. 2, there is shown a flowchart of a method 200 for operating the vehicle system 10. The method 200 includes sensing data from one or more vehicles (at block 202). The remote controller can then retrieve driver data, vehicle data, and map data (at block 204). Evaluate the behavior, i.e., driving methods, of the driver (at block 206). Generate a score by rating the driver's behavior, thus providing a driver score and/or vehicle score (at block 208). Thereafter, the remote computer 18 may generate a risk meter 300 based on the retrieved data and the generated score (at block 210). The remote computer 18 can then publish data about the driver's behavior, including the generated score, the risk meter, driver profiles, vehicle profiles, and other driving data (at block 212). Thereafter, the remote computer 18 may store the generated data (at block 214).

Figure 3:
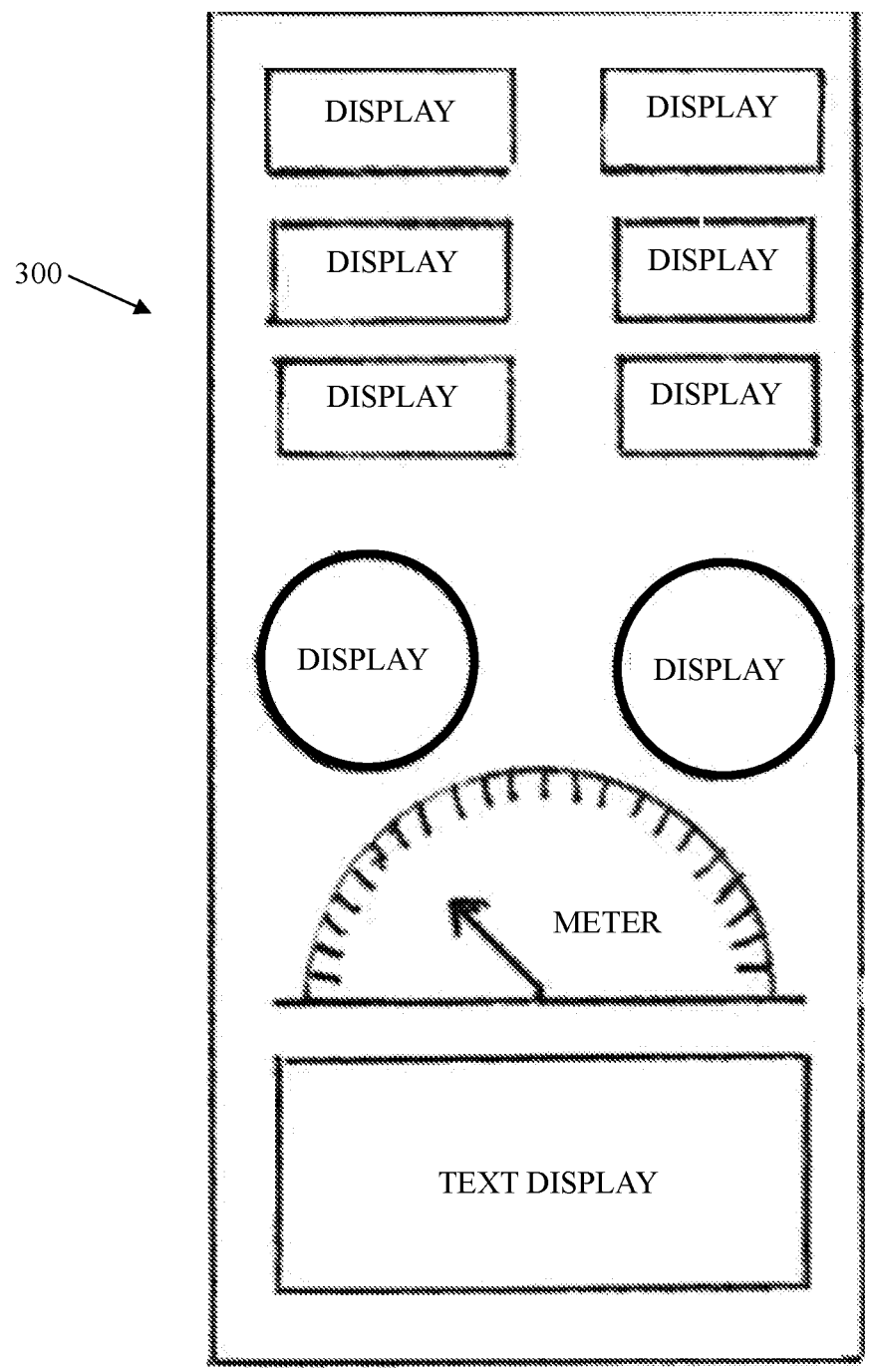
FIG. 3 is a schematic view of a risk meter.

Referring to FIG. 3, the risk meter 300 can display a meter which illustrates the driver's and/or vehicle's score and displays, such as graphical and text displays and overlays. After generating the risk meter, the remote computer 18 can update the meter and the other displays based upon the driver's present driving behavior. The meter may indicate the driver's behavior from risky and bad (far left) to safe and good (far right).

Figure 4:
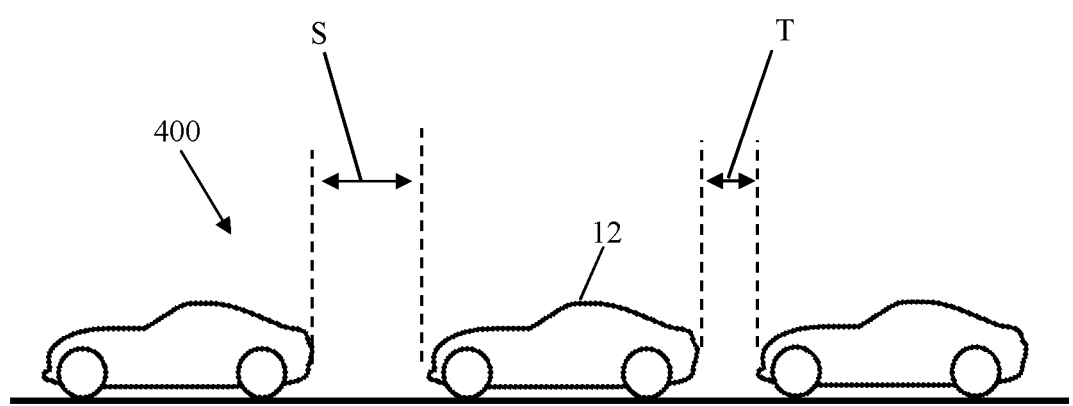
FIG. 4 is a schematic view of the vehicle system, illustrating a driving scenario wherein one vehicle is tailgating another vehicle.

Referring to FIG. 4, the system can monitor, evaluate, and update the risk meter based upon a given driving scenario 400, such as when the driver is driving their vehicle 12 in traffic. Hence, the risk meter 300 can be updated with the driver's vehicle space cushion management skills whilst driving in traffic. As shown, the driver has positioned their vehicle 12 from the preceding vehicle at a good and standard distance S. As an example, the safe distance can be a distance of three second from the rear of the preceding vehicle to the front of the subject vehicle 12. As discussed in more detail below, the remote computer 18 may accordingly award the driver with a higher score and update the risk meter accordingly. Unfortunately, the driver behind the subject vehicle 12 is tailgating the subject vehicle 12, following at an unsafe, tailgating distance T.

The risk meter 300 uses its accumulated driving history data about drivers and vehicles to continuously display and publish, via the internet, in real time, for the public (everyone including the drivers) the vehicle's and the driver's measurements of driving risk. This invention's publishing to the internet makes each risk meter available for viewing on many devises such as cell phones, laptops, etc. The system's generated output(s) can also be outputted directly to vehicles for the display therein and/or user devices.

The risk gauge or meter 300 can constantly display at any time the following items on a vehicle and via the internet: The vehicle's current measurement of driving risk. The subject driver's current Personal Driving Score. Personal Driving Score history analysis. The current Vehicle's Risk Score. Vehicle's Risk Score (VRS) history analysis. The subject driver's current Driving Habit Score (DHS). Driving Habit Score (DHS) history analysis. The increase or decrease of measurement of driving risk occurring at any instant. The measurement of average driving risk as accumulated over a period of time. The increase or decrease of measurement of driving risk created over a period of time. A constantly displayed indicator showing drivers how this invention has categorized their current driving methods or techniques as either defensive or aggressive. An indicator displaying any current violation of traffic law. An indicator displaying all past violations of traffic law. An indicator of the subject driver's sobriety level when driving. The user is able to toggle to the different items of information available for display on the risk gauge or meter. The driving risk gauge or meter can be incorporated into existing display screen(s) on vehicles, or can be installed as a separate display unit. The driving risk gauge or meter results can be displayed digitally or on a dial or with audio or any other means that is available or may become available.

The vehicle system constantly and instantly exposes to everyone most all instances of unsafe or aggressive driving. Analyzes, evaluates, assesses and rates driver's responses and reactions to most all driving scenarios and events that might occur while driving. Driver's being aware of constant and instant automated monitoring of their driving provides a much more powerful and constant encouragement for drivers to drive safely voluntarily. Constantly and instantly displays for users (users include the driver and the public), in real time, a measurement of risk created or reduced by individual drivers and by individual vehicles thereby providing for insurers a much more effective means of evaluating the risk they take when providing insurance for drivers and vehicles. Constantly and instantly displays for drivers, in real time, a measurement of risk created or reduced when driving thereby providing for drivers a much more effective means of evaluating the risk they take when driving. Publishes a record of history of each driver's increase or decrease of risk they created. Publishes a record of history of each vehicle's increase or decrease of risk it created. Learns drivers habits and considers each driver's habits when metering or rating or scoring each driver. Has extensive programming about each driver's use of space management (Driving Space Cushion) as a defensive driving method. Can provide warnings to drivers that are approaching dangerous situations. When enabled by certain users, publishes most all traffic rule or traffic law violations executed by drivers when driving. Constant and instant automated monitoring and publishing of each driver's traffic law violations provided by this invention, when enabled to do so, provides a much less expensive and more constant and effective method of patrolling highways for traffic law violators. Driver's being aware of constant and instant publishing of their traffic law violations provides a much more powerful and constant encouragement for drivers obey traffic law voluntarily. Constantly and instantly exposes to everyone at all times drivers that are driving while impaired or fatigued. Driver's being aware of constant and instant publishing of their impaired driving provides a much more powerful and constant encouragement for drivers not to drive while impaired or fatigued voluntarily. Provides an evidentiary record or trail of driving events and circumstances leading up to a traffic accident or any event. This invention can evaluate, test and qualify or disqualify new drivers more completely, more efficiently and at less cost the current methods used for testing new drivers. This invention leaves the driving to the driver. This invention does not intervene robotically, or mechanically with the driver's control of a vehicle. The driver is still responsible for driving. Any driving intervention equipment available on a vehicle can be enabled by this invention if selected by the user. This invention can, due to the extensive driver evaluation programming within this software, evaluate the driving proficiency of new drivers more thoroughly and at much lower cost than the current methods. Can help make us all better drivers. This invention has programming designed to introduce and acclimate people to this invention so as to improve people's likelihood to use it effectively.

Individual and business demographics that would use this invention: the General Public. Drivers; insurance Companies; fleet owners; data collection companies such as Lexis Nexis; government agencies such as police, department of Motor vehicles, department of highways, and many others.

The vehicle system has numerous benefits, including the following. Constantly monitors, records and publishes most all aspects of each driver's driving ways, methods, and or characteristics thereby reducing driving risk for everyone. Makes drivers more personally and financially responsible for most all instances of driving risk they create for themselves and others thereby reducing driving risk for everyone. Reduces the risk of driving. Reduces traffic accidents. Saves lives. Reduces injuries. Reduces property damage. Saves money. Makes roads and highways safer. Helps insurance companies evaluate the risk they take by insuring particular drivers and particular vehicles. Based on Personal Driving Scores assigned by this invention to each driver and each vehicle along with information about each driver's methods and habits, insurance companies will be able to place the true cost of driving risk more proportionately among drivers and vehicles. Those that produce more risk should pay more to insure that risk and those that create less risk should have a lesser cost to insure that risk. Gives drivers financial incentives to drive safe. Strongly encourages drivers to drive safer due to their awareness of the constant and instant publishing of data about their driving characteristics including their Personal Driving Score. Strongly encourages drivers to drive safer due to their awareness of the constant and instant publishing of their failure to obey traffic laws. Strongly encourages drivers to obey traffic laws due to their awareness of the constant and instant publishing of their traffic law violations. Constantly and instantly exposes to everyone at all times drivers that are driving while impaired (drunk drivers). Strongly encourages drivers to not to drive when their driving is impaired or fatigued due to their awareness of the constant and instant exposure and publishing of their impaired driving. Recognizes impaired or fatigued drivers. Publishes notifications and warnings of impaired or fatigued drivers. Reduces the number of impaired or fatigued drivers on our roads. Reduces chain reaction accidents that occur in traffic clusters. Reduces delays or traffic jams on our roads and highways caused by traffic accidents. Reduces tailgating on roads and highways. Provide warnings to drivers that are approaching dangerous situations. Encourages better driving by providing driver training. Can reduce the expense of investigating traffic accidents for police and other responders. Can reduce the expense of enforcing traffic laws by reporting or publishing traffic law violations executed by drivers. Makes the location of vehicles constantly available to everyone discouraging crimes and getaways using vehicles. Can improve and reduce the cost of "new driver" licensing qualification methods.

The Personal Driving Score developed by this invention for drivers will provide a much more thorough evaluation of a new driver's skill level than the driver testing currently done by the US States due to the extensive Personal Driver Scoring parameters built in to this invention. This invention is capable of rating or scoring new drivers on most all driving skills and scenarios thereby giving the State's a better and less expensive method of evaluating new drivers. The State authorities are able to enter into this invention their specific instructions qualifications required for "new driver" scoring or rating.

This invention makes highways safer due to, along with many other things, the driving space management (Driving Space Cushion—following distance from vehicle in front) programming built into this software program which would reduce chain reaction traffic accidents which, again, would reduce deaths, injuries and property damage. Increases safety and reduces danger on roads. Constantly produces and displays measurements of driving risk along with measurements of increase or decrease of driving risk. Can help train new drivers. Can help make us all better drivers. The benefit of the wide-spread implementation of this invention is many times greater than can be described herein. For example: each life saved will then be of further benefit to mankind. And each dollar saved can then be used for something else. And each injury prevented will reduce pain and suffering.

This invention is a computer implemented method of constantly monitoring and extensively analyzing, evaluating and instantly publishing, to everyone, the habits, ways and methods (all aspects) used by drivers when driving.

This invention uses many devises, such as sensors, to constantly monitor, record, rate and instantly publish the driver's ways of driving. This invention makes unsafe or aggressive driver's more personally and financially responsible and accountable for most all instances of risk they create for themselves and others by monitoring, rating and instantly publishing all aspects of their driving thereby decreasing risk of death, injury or property damage for all drivers and passengers.

This invention uses many devises to analyze, evaluate, and assess data it accumulates on the driving techniques, methods, characteristics, and established habits used by individual drivers of specific vehicles when driving to determine the amount of driving risk created by each driver and each vehicle by comparing their driving history data to safe driving parameters within this software as selected by various users.

Driving history data and information accumulated by this invention along with ratings and scores on each driver and each vehicle are constantly and instantly published and made available to various users, at different levels, by means of the internet and by other methods.

This invention assigns earned ratings to each driver and each vehicle based, along with other factors, on the amount of driving risk they create or reduce. One of the rating methods performed by this invention is to assign an earned Personal Driving Score to each driver and a Vehicle Risk Score to each vehicle.

This invention also features a driving risk gauge or meter that uses its accumulated driving history data about drivers to continuously display and instantly publish, via the internet, in real time, the vehicle's and the driver's measurements of driving risk. This invention's publishing to the internet makes each risk meter available for viewing on many devises such as cell phones, laptops, etc. This invention's risk gauge or meter can constantly display at any time the following items on a vehicle and via the internet. The subject driver's current measurement of driving risk. The vehicle's current measurement of driving risk. The subject driver's current Personal Driving Score. Personal Driving Score history analysis. The current Vehicle's Risk Score. Vehicle's Risk Score (VRS) history analysis. The subject driver's current Driving Habit Score (DHS). Driving Habit Score (DHS) history analysis. The increase or decrease of measurement of driving risk occurring at any instant. The measurement of average driving risk as accumulated over a period of time. The increase or decrease of measurement of driving risk created over a period of time. A constantly displayed indicator showing drivers how this invention has categorized their current driving methods or techniques as either defensive or aggressive. An indicator displaying any current violation of traffic law. An indicator displaying all past violations of traffic law. An indicator of the subject driver's sobriety level when driving.

The user is able to toggle to the different items of information available for display on the risk gauge or meter. The driving risk gauge or meter can be incorporated into existing display screen(s) on vehicles, or can be installed as a separate display unit. The driving risk gauge or meter results can be displayed digitally or on a dial or with audio or any other means that is available or may become available.

A copy of each specific driving risk gauge or meter is published on display within each vehicle's website profile account and each individual driver's website profile account on an internet website of the invention. This invention has programming designed to introduce and acclimate people to this invention so as to improve people's likelihood to use it effectively. When this software invention is fully developed it will contain thousands of computer programming statements and commands designed to make it do everything described herein.

This invention is a computer implemented method of constantly monitoring and extensively analyzing, evaluating and instantly publishing, to everyone, the habits, ways and methods (all aspects) used by drivers when driving.

This invention uses many devises, such as sensors, to constantly and extensively monitor, rate and instantly publish the driver's ways of driving. This invention makes unsafe or aggressive driver's more personally and financially responsible and accountable for most all instances of risk they create for themselves and others by monitoring, rating and instantly publishing all aspects of their driving thereby decreasing risk of death, injury or property damage for all drivers and passengers.

This software invention analyzes, evaluates, and assesses data it accumulates on the driving techniques, methods, characteristics, and established habits used by individual drivers of specific vehicles when driving to determine the amount of driving risk created by each driver and each vehicle by comparing that driving history data to safe driving parameters within this software as selected by various users.

This invention assigns earned ratings to each driver and each vehicle based, along with other factors, on the amount of driving risk they create or reduce. One of the rating methods performed by this invention is to assign an earned Personal Driving Score to each driver and a Vehicle Risk Score to each vehicle.

Driving history data and information accumulated by this invention along with ratings and scores on each driver and each vehicle are constantly and instantly published and made available to various users, at different levels, by means of the internet and by other methods.

This invention also features a driving risk gauge or meter that uses its accumulated driving history data about drivers to continuously display and instantly publish, via the internet, in real time, the vehicle's and the driver's measurements of driving risk. This invention's publishing to the internet makes each risk meter available for viewing on many devises such as cell phones, laptops, etc. This invention's risk gauge or meter can constantly display at any time the following items on a vehicle and via the internet. The driver's current measurement of driving risk. The vehicle's current measurement of driving risk. The subject driver's current Personal Driving Score. Personal Driving Score history analysis. The current Vehicle's Risk Score. Vehicle's Risk Score (VRS) history analysis. The subject driver's current Driving Habit Score (DHS). Driving Habit Score (DHS) history analysis. The increase or decrease of measurement of driving risk occurring at any instant. The measurement of average driving risk as accumulated over a period of time. The increase or decrease of measurement of driving risk created over a period of time. A constantly displayed indicator showing drivers how this invention has categorized their current driving methods or techniques as either defensive or aggressive. An indicator displaying any current violation of traffic law. An indicator displaying all past violations of traffic law. An indicator of the subject driver's sobriety level when driving.

The user is able to toggle to the different items of information available for display on the risk gauge or meter.

The driving risk gauge or meter can be incorporated into existing display screen(s) on vehicles or can be installed as a separate display unit. The driving risk gauge or meter results can be displayed digitally or on a dial or with audio or any other means that is available or may become available.

A copy of each specific driving risk gauge or meter is published on display within each vehicle's website profile account and each individual driver's website profile account.

The vehicle system includes a machine such as a computer or processor to run the software program. Installation on vehicle or remote access to vehicle or the identity of vehicle. Communication or operation in sync or in conjunction with on-board vehicle systems.

Communication or operation in sync or in conjunction with other systems. Even though this software can be run on remote computers this invention must be installed on vehicles in order to be most effective.

This invention needs to receive vital information pertaining to the location, speed, and distance, direction and other information regarding vehicles and other objects in order to be most effective.

This invention is designed receive information from and operate in sync or in conjunction, or communication with the on board systems on vehicles such as, computers, processors, gauges, speedometers, odometers, sensors, Global Positioning System equipment, satellites, radar, sonar, transmitters, transponders, receivers, radios, turn signals, brake signals, tracking devises, steering equipment, display screens, control panels, braking and accelerating equipment, etcetera or any other means capable of delivering useful information to this invention. Connection to Internet. Satellite connection is optional but recommended. Future use of new technologies and equipment as made available.

This invention will be most effective if it is installed and used on many or all vehicles. note—Obviously, it may take a number of years for this invention to be fully effective due to the fact that many of the vehicles on the road won't have the technology on board needed to get the full benefit of this invention. For example, a 1969 Chevelle will not have any of the sensors or computers needed by this invention to be fully functional. However, this invention has programming to make it take full advantage of whatever equipment is available on any given vehicle and adjust itself accordingly to operate as fully as possible with the equipment that is available. Some of today's vehicles already have some of the equipment used by this invention built into the vehicle. For example, some more recent vehicles have sensors can determine when the vehicle begins drifting out of its lane.

Driver Scoring or rating parameters or weighting or significances can be adjusted by each U.S. State and various other users. Each category of users has different levels of ability to adjust or set weighting or significance of driver scoring parameters.

This invention publishes the driver and vehicle scoring and data, at different levels of availability for various users, on the Internet or any other communication or publishing method available or deemed as useful. In addition the driver and vehicle scoring and data is available to the subject driver. Levels or methods of reporting violations of law can be set or adjusted by various users. Some users can limit the ability to start the vehicle. Levels or methods of reporting results can be set or adjusted by various users.

This invention has pre-programmed levels or tiers of driver admonishment available for selection by some users. Allows some users to increase or decrease levels of admonishment for driver's safety violations. Levels of driver admonishment for each driving scenario can be set or adjusted by various users. This invention allows some users to set weighting or significances for Driver Scoring and driver admonishment for all driving factors. This invention allows some users to set weighting or significances for Driver Scoring and driver admonishment for different kinds vehicles such as automobiles or trucks. Driver Admonishments can be enabled or disabled by some users.

Drivers may be able to enable or disable this invention. (If disabled probably results in no insurance savings and possibly results in higher insurance rate). Some users may be able to set the level of which a driver can enable or disable within this invention either all of it or part of it.

This invention has programming which archives who is authorized to start a particular vehicle thereby eliminating unauthorized persons from starting vehicles. The user is able to toggle to the different items or information available for display on the Risk Gauge or Meter. Drivers that have been convicted of DUI or DWI that blow a breathalyzer reading equal to or greater than the legal blood alcohol content will not be able to start any vehicle with this invention installed on it. This feature can be disabled by some users and may require a court order.

The vehicle system can evaluate drivers on the following factors. Some driving factors that are analyzed, assessed and evaluated by this invention for monitoring and rating purposes are: Driver's Habits, Driving Space Cushion Management, Speed Management, Lane Usage, Scanning or Observation Skills, Other Vehicles, Lane Changes, Seat Belts Usage, Passing skill, Train Crossings, One Ways, Scanning by Sensors, acceleration, braking, backing, parking, time driven, time driven that day, reaction times, weather, observation of driving laws, attitude, government driving record, MVR Motor Vehicle Record, truckers skills, sobriety, Speed related to distance from moving vehicle in front in same lane or rate of approach, Deceleration related to distance from stopping or slowing vehicle in front in same lane or rate of approach, Deceleration related to distance from obstruction in front in same lane or rate of approach, Deceleration related to approaching turns or curves or any other maneuver, vehicle on driver side, vehicle on passenger side obstruction on passenger side obstruction on driver side vehicle, Lane merging into your lane seatbelt, driver fatigue, impairments i.e., drugs, alcohol, fatigue, mirrors, equipment, tires, observation, spot mirrors, breathalyzer for persons with DUI convictions, red lights, yellow lights, Weather Speed relative to speed limit, following distance relative to lane change parameters for example, distance to vehicle in front during lane change, Distance to vehicle behind in Lane changing, and/or approach speed of vehicle pulling in front of middle lane (both ways lane).

Driver characteristics that are "learned" by this invention are: Driver's Habits, Driver's Attitude, Scanning by Driver, and Driver's Observation Skill. Many events that involve a driver's scanning or observation skills, such as when a driver fails to notice a danger, are noted by this invention and this invention uses this data to learn about a driver's scanning or observation skills.

Some formulas that are used by this invention to analyze, assess and evaluate for monitoring and rating purposes are: Acceleration Rate, equals change of speed divided by time. Deceleration Rate, equals change of speed divided by time. 12 meters per second divided by 3 seconds equals 4 meters per second. 60 miles per hour equals 1 mile per minute.

Distance Per Second. 1 mile per hour equals 1.466 feet per second 10 miles per hour equals 14.666 feet per second 15 miles per hour equals 22 ft per second, 20 miles per hour equals 29.3 feet per second 25 miles per hour equals 36.6 ft per second, and 80 miles per hour equals 117 feet per second.

Rates of Approach to vehicle in front of subject vehicle from vehicle behind subject vehicle. Acceleration Rate during approach toward subject vehicle. Deceleration Rate during approach toward subject vehicle, and Reaction Time.

In operation, the invention constantly monitors and makes a record of all the driving activity of each driver and each vehicle including things such as location, speeds driven, routes driven, aggressive and defensive driving events, space management, traffic law violations, braking reactions, safety usage, the driver's skill or of it, etc. In short, most all of the driving activity of each driver and each vehicle.

This invention uses many devises to analyze, evaluate, and assess data it accumulates on the driving techniques, methods, characteristics, and established habits used by individual drivers of specific vehicles when driving to determine the amount of driving risk created by each driver and each vehicle by comparing that driving history data to safe driving parameters within this software as selected by various users.

This invention assigns earned ratings to each driver and each vehicle based, along with other factors, on the amount of driving risk they create or reduce. One of the rating methods performed by this invention is to assign an earned Personal Driving Score to each driver and a Vehicle Risk Score to each vehicle.

Accumulated driving characteristic data, Vehicle's Risk Scores and Personal Driving Scores are constantly and instantly published and made available to various users by this invention, at different levels, by means of the internet and or by other methods. Companies such as LexisNexis, insurance companies, government agencies, drivers, vehicle owners, and the general public are all able to access the information about drivers and vehicles through websites on the internet.

This invention also features a driving risk gauge or meter that uses its accumulated driving history data about drivers to continuously display and instantly publish, via the internet, in real time, the vehicle's and the driver's measurements of driving risk. This invention's publishing to the internet makes each risk meter available for viewing on many devises such as cell phones, laptops, etc. This invention's risk gauge or meter can constantly display at any time the following items on a vehicle and via the internet: The subject driver's current measurement of driving risk. The vehicle's current measurement of driving risk. The subject driver's current Personal Driving Score. Personal Driving Score history analysis. The current Vehicle's Risk Score.

Vehicle's Risk Score (VRS) history analysis. The subject driver's current Driving Habit Score (DHS). Driving Habit Score (DHS) history analysis. The increase or decrease of measurement of driving risk occurring at any instant. The measurement of average driving risk as accumulated over a period of time. The increase or decrease of measurement of driving risk created over a period of time. A constantly displayed indicator showing drivers how this invention has categorized their current driving methods or techniques as either defensive or aggressive. An indicator displaying any current violation of traffic law. An indicator displaying all past violations of traffic law. An indicator of the subject driver's sobriety level when driving. The user is able to toggle to the different items of information available for display on the risk gauge or meter.

The driving risk gauge or meter can be incorporated into existing display screen(s) on vehicles, or can be installed as a separate display unit. The driving risk gauge or meter results can be displayed digitally or on a dial or with audio or any other means that is available or may become available. A copy of each specific driving risk gauge or meter is published on display within each vehicle's website profile account and each individual driver's website profile account on the invention internet website.

This invention is designed and programmed to receive information from and operate in sync or in conjunction, or communication with other on board systems on vehicles such as, computers, processors, gauges, speedometers, odometers, sensors, Global Positioning System equipment, satellites, radar, sonar, transmitters, transponders, receivers, radios, turn signals, brake signals, tracking devises, steering equipment, display screens, control panels, braking and accelerating equipment, batteries, etcetera, along with any other new or pertinent equipment or technology that is available or may become available or any other means capable of delivering useful information to this invention.

This invention receives vital information pertaining to the location, speed, and distance, direction and other pertinent information regarding vehicles and other objects in order to perform its functions.

This invention is programmed to maximize its use of whatever pertinent information is available from any source to accomplish its functions. As a result this invention is capable of doing many of its functions on vehicles that do not have this invention installed on board.

This invention operates on remote computers in addition to computers on vehicles. This invention is designed and programmed to remotely (on remote computers) receive information from and operate in sync or in conjunction, or communication with other on board systems on vehicles such as, computers, processors, gauges, speedometers, odometers, sensors, Global Positioning System equipment, satellites, radar, sonar, transmitters, transponders, receivers, radios, turn signals, brake signals, tracking devises, steering equipment, display screens, control panels, braking and accelerating equipment, batteries, etcetera, along with any other new or pertinent equipment or technology that is available or may become available or any other means capable of delivering useful information to this invention. As a result this invention is capable of doing many of its functions on vehicles that do not have this invention installed on board the vehicle.

This invention receives vital information pertaining to the location, speed, and distance, direction and other pertinent information regarding vehicles and other objects in order to perform its functions.

This invention is programmed to associate each driver with vehicle they drive. This invention is programmed to enable communication with this invention on other vehicles (including vehicles that do not have this invention installed or running on it).

This invention has programming to identify and recognize all vehicles (including vehicles that do not have this invention installed or running on it) using any or all forms of identification available such as license plates, transponders, internet identifiers, vehicle registrations, signals, or any other form of vehicle identification available or may become available.

This invention has programming to monitor, publish, and make a record of all identified vehicle's activity (including vehicles that do not have this invention installed or running on it) including things such as location, speeds driven, routes driven, aggressive and defensive driving events, space management, driver's braking reactions, location and direction of each vehicle and more.

This invention has programming to extrapolate or derive all identified vehicle's activity (including vehicles that do not have this invention installed or running on it) including things such as location, speeds driven, routes driven, aggressive and defensive driving events, space management, driver's braking reactions, location and direction of each vehicle and more using Global Position System locating and or tracking devices.

This invention has programming to receive information from and operate in sync or in conjunction, or communication with the other on board systems on vehicles (including vehicles that do not have this invention installed or running on it) such as, computers, processors, gauges, speedometers, odometers, sensors, Global Positioning System equipment, satellites, radar, sonar, transmitters, transponders, receivers, radios, turn signals, brake signals, tracking devises, steering equipment, display screens, control panels, braking and accelerating equipment, etcetera or any other means capable of delivering useful information or data to this invention.

This invention has programming to receive vital information pertaining to the location, speed, and distance, direction and other pertinent information regarding vehicles and other objects in order to perform its functions.

This invention has programming to make and publish profiles on drivers and vehicles that do not have this invention installed or running on it, if that driver or vehicle is identified by this invention.

This invention has programming to assist in identification of specific drivers of vehicles that do not have this invention installed or running on it.

This invention is programmed to do extensive collection of data regarding all aspects of driving risk created or reduced by drivers.

This invention is programmed to do extensive collection of data regarding all aspects of driving skill, or the lack of it, exhibited by drivers.

This invention is programmed to do extensive collection of data regarding all aspects of driving techniques and methods, exhibited by drivers.

This invention is programmed to do extensive collection of data regarding all aspects of driving safety skill, or the lack of it, exhibited by drivers.

This invention is programmed to do extensive collection of data regarding each driver's reaction to driving scenarios and driving events.

This invention is programmed to do extensive collection of data regarding driving habits exhibited by drivers.

This invention is programmed to do extensive collection of data regarding driver's Driving Space Cushion management and usage.

Using various technologies (such as sensors, GPS, screens) this invention is programmed to do extensive collection of information about vehicles (such as location, speed, turning signals) and other objects.

Using various technologies (such as sensors, GPS, screens) this invention is programmed to do extensive collection of information about vehicles (such as location, speed, turning signals) and other objects in the area of the subject vehicle to provide the subject driver a scan or picture of activity in the area surrounding the subject vehicle.

This invention has programming which provides warnings to drivers that are approaching dangerous situations. This invention has programming which recognizes when any driver has impaired or fatigued driving by considering and evaluating certain driving events executed by a driver.

This invention has programming which considers and evaluates each driver's habits individually when attempting to recognizes certain driving events exhibited by a driver that would indicate that that driver has impaired or fatigued driving. This invention has programming which publishes notifications of any driver that this invention has recognized as exhibiting impaired or fatigued driving. This invention has programming which provides warnings to any driver that this invention has recognized as exhibiting impaired or fatigued driving.

This invention has programming which, if selected and enabled by certain users (law enforcement users . . . requires court order), can disable any vehicle, that this invention has recognized as exhibiting impaired or fatigued driving.

This invention does extensive collection of data regarding driver's cell phone usage while driving. Has programming that senses driver's cell phone usage while driving. This invention can notice when a driver is looking at his or her cell phone or to what extent a driver is using a cell phone while driving. Driver's cell phone usages recognized by this invention include texting, talking on phone hands free or in hand, using GPS, any keyboard usage, game playing, watching videos, listening to music and much more. In addition, this invention recognizes when the driver is using his cell phone through instrumentation built into the vehicle (such as Blue Tooth connections).

This invention does extensive collection of data regarding driver's and passenger's seat belt usage. This invention does extensive data collection on the numbers of safety violations a driver does. This invention does extensive data collection on the numbers of positive driving methods a driver uses. This invention does extensive data collection on all driving methods a driver uses. This invention does extensive data collection on each driver's reaction to each specific driving scenario or event encountered. This invention does extensive data collection on most all common decisions made by drivers about most all driving scenarios that they encounter. For example, during a left turn drivers must evaluate the distance and speed or rate of approach of the oncoming traffic approaching in order to decide when they can safely execute the left turn. Or, anytime drivers are entering traffic (like when turn right onto an intersecting roadway) drivers must evaluate the distance and speed or rate of approach of the oncoming traffic approaching in order to decide when they can safely execute the maneuver.

This invention does extensive data collection on each instance of a drivers failure to obey traffic laws. This invention has programming to include knowledge of all traffic laws in each US State. This invention can be updated to include knowledge of all traffic laws throughout the world. This invention can be updated to include knowledge of all new or changed traffic laws. This invention is constantly updated by information from Google Maps® including things such as speed limits, lane designs and any other pertinent or useful information.

This invention has programming to establish a recorded history of each driver's response and reaction to driving scenarios and driving events. This invention has programming which includes extensive detailed information about each and every driving situation or scenario that may be encountered by someone driving a vehicle which is used by this invention to do its functions. For example: A driver must decide when it is safe to make a left turn. This invention will use extensive detailed information about each and every driving situation or scenario to analyze, assess, evaluate and rate the amount of safety or risk the driver accepted before executing his left turn or any maneuver. Each driving situation or scenario is assigned safety or risk parameters for use in consideration by this invention. When this software invention is fully developed thousands of "IF . . . THEN" computer statements and commands will probably be involved in order for this software invention do its functions (which includes analyzing, assessing, evaluating and rating each event encountered by a driver).

This invention uses many devises to analyze, evaluate, and assess accumulated data on the driving techniques, methods and established habits used by individual drivers of specific vehicles to determine the amount of risk created by each driver and each vehicle by comparing that driving history data to preset safe driving parameters within this invention as selected by various users.

This invention assigns earned ratings or scores to each driver and each vehicle based, along with other factors, on the amount of driving risk they create or reduce. One of the rating methods performed by this invention is to assign an earned Personal Driving Score to each driver and a Vehicle Risk Score to each vehicle.

This invention is programmed to analyze and assess most every driving situation or scenario that any driver may encounter while driving. The Driver Scoring parameters built in to this invention take into consideration most any and all driving factors, driving scenarios, driving events and safety considerations involved with driving a vehicle. In addition, this invention is adaptable and updateable to allow for additions of new pertinent information or technology that may become available.

This invention has programming that enables it to analyze, evaluate, and assess accumulated data on the driving techniques, methods and established habits of drivers in vehicles that do not have this invention in use on their vehicle. This invention has programming to learn the driver's level of driving skill. This invention has programming to learn the driver's level of driving safety. This invention does extensive analysis, assessment and evaluation of drivers driving methods for the purpose of categorizing those driving methods as defensive or aggressive driving methods.

This invention establishes record of driving risk history for each vehicle and uses that record for scoring or rating that vehicle. Thereby creating and providing a risk rating or Vehicle's Risk Score (VRS) on the subject vehicle which could be used by insurance companies to evaluate the risk they take by insuring that vehicle. This invention establishes record of driving risk history for each driver. Thereby creating and providing a risk rating or Personal Driving Score (PDS) on the subject driver which could be used by insurance companies to evaluate the risk they take by insuring that driver.

This invention has programming that makes a record of driving risk experienced by each vehicle for the entire life of the vehicle. This invention has programming that constantly monitors and makes a record of all the activity of each vehicle including things such as location, speeds driven, routes driven, aggressive and defensive driving events, space management, driver's braking reactions, location and direction of each vehicle and more. This invention has standard or recommended levels of Driver Scoring programmed in for all driving factors, driving scenarios, driving events and safety considerations involved with driving a vehicle. When a driver exhibits defensive, safe, positive driving methods his or her rating, or scores go up. When a driver exhibits aggressive, unsafe, negative driving methods his or her rating or scores go down.

This invention has several different methods of Driver Scoring. This invention has pre-programmed levels of Driver Scoring available for selection by some users.

This invention is programmed to provide methods and levels of Driver Scoring that can be set or adjusted by some users. This invention incorporates the drivers motor vehicle record or MVR into this invention for analysis, evaluation and assessment for driver rating. This invention has programming to establish a recorded history of each driver's response and reaction to driving scenarios and driving events to establish the trend of each driver's driving habits.

This invention has programming to "learn" each driver's driving habits. This invention has extensive programming to assess, evaluate, and rate a driver's driving habits and then assigns each driver a Driving Habit Score (DHS). For example driver that habitually uses a good Driving Space Cushion will have a better Driving Habit Score (DHS) and a driver that habitually drives 20 miles per hour over the speed limit will have a worse Driving Habit Score (DHS). The Driving Habit Score (DHS) of a driver's driving habits has a heavy weighting or significance in determining a driver's Personal Driving Score. This invention categorizes each driver's habits into categories such as excellent, good, fair, poor, bad, terrible, etc. A driver's driving habits are a major factor in reducing or increasing risk because a driver's driving habits prevail most of the time while driving. People do not concentrate on their driving 100% of the time. Driving habits will prevail when persons are not concentrating on their driving. In addition, driving habits will prevail when persons are concentrating on their driving. Again, a driver's driving habits prevail most of the time when driving, hence, a driver's driving habits or Driving Habit Score (DHS) has heavy weighting or significance on the driver's Personal Driving Score assigned to drivers by this invention.

This invention has extensive programming to assess, evaluate, and rate a driver's drivers use of the "Driving Space Cushion" as a safety tool. (Driving Space Cushion refers primarily to the vehicles following distance from the vehicle in front . . . recommended no less than 3 seconds following distance). Drivers that follow other vehicles too closely, tailgating, will have a much worse score than a driver that always keep sufficient space, at least 3 seconds following distance, between his or her vehicle and the vehicle directly in front. This invention has major emphasis on the Driving Space Cushion because the Driving Space Cushion is one of the most powerful safety tools available to drivers. The deadly chain reaction accidents on our highways are most often the result of vehicles traveling very close to each other OR in CLUSTERS. "This invention's" major emphasis on the can prevent some of these deadly and expensive chain reaction accidents.

This invention has selection settings for following distance of 3 seconds, 3.5 seconds, 4 seconds 4.5 seconds, 5 seconds. This invention has programming to use the 3 second following distance (from the vehicle in front) as the standard or recommended following distance setting. This setting can be adjusted by various users. This invention has programming for high levels of driver admonishment for tailgating defined as following distance of less than 3 seconds.

This invention makes analysis documents about trips made by drivers for publishing. This invention makes analysis documents each driver's methods and techniques for publishing. This invention makes analysis documents about collected data regarding each vehicle for publishing. This invention has several different levels of publishing results. Levels or methods of publishing results can be selected or adjusted by various users. This invention has programming that will publish and display for analysis of the driver's last trip showing all the positive and negative driving methods or techniques they used while on their last trip. This invention has programming that will publish and display for an analysis of the driver's driving methods or techniques they used during any period selected.

This invention lets drivers input their desired route to provide automatic analysis of their route for safety and driving considerations. For example drivers will be become more informed and better able to prepare for lane changes or turns as they approach each one. GPS Routing Programs such as Google Maps® can be incorporated into this invention to provide analysis of complete routes. This invention can suggest when safe maneuvers are available as needed to accomplish desired route or when those maneuvers needed to accomplish desired route are not safely available.

This invention has programming that lets drivers request future lane change analysis prior to a lane change. This invention has programming that lets drivers request future turn analysis prior to turns.

This invention also features a driving risk gauge or meter that uses its accumulated driving history data about drivers to continuously display and publish, via the internet, in real time, for the public (everyone including the drivers) the vehicle's and the driver's measurements of driving risk. This invention's publishing to the internet makes each risk meter available for viewing on many devises such as cell phones, laptops, etc. This invention's risk gauge or meter can constantly display at any time the following items on a vehicle and via the internet: The subject driver's current measurement of driving risk. The vehicle's current measurement of driving risk. The subject driver's current Personal Driving Score Personal Driving Score history analysis. The current Vehicle's Risk Score. Vehicle's Risk Score (VRS) history analysis. The subject driver's current Driving Habit Score (DHS). Driving Habit Score (DHS) history analysis. The increase or decrease of measurement of driving risk occurring at any instant. The measurement of average driving risk as accumulated over a period of time. The increase or decrease of measurement of driving risk created over a period of time. A constantly displayed indicator showing drivers how this invention has categorized their current driving methods or techniques as either defensive or aggressive. An indicator displaying any current violation of traffic law. An indicator displaying all past violations of traffic law. An indicator of the subject driver's sobriety level when driving.

The user is able to toggle to the different items of information available for display on the risk gauge or meter. The driving risk gauge or meter can be incorporated into existing display screen(s) on vehicles or can be installed as a separate display unit. A copy of each specific driving risk gauge or meter is published on display within each vehicle's website profile account and each individual driver's website profile account on the invention internet website. The driving risk gauge or meter results can be displayed digitally or on a dial or with audio or any other means that is available or may become available.

This invention recognizes failure or lack of a vehicle's modules, components, equipment or systems used by this invention and adjusts itself accordingly to operate as efficiently as possible with the vehicle's existing working modules, components, equipment or systems.

This invention has programming that recognizes failure or lack of a vehicle's modules, components, equipment or systems used by drivers and notifies driver of same. There are built in notifications within this invention to make users aware of any adjustments or limitations within This invention due to lack or failure of equipment or systems or weather or any other reason. Some on board equipment or systems used by this invention may not be available on some vehicles. For example, a 1969 Chevelle will not have any of the sensors or computers needed by this invention to be fully functional. Obviously, it may take a number of years for this invention to be fully effective due to the fact that many of the vehicles on the road won't have the technology on board needed to get the full benefit of this invention.

This invention has programming to cause it to take full advantage of whatever equipment is available on any given vehicle and adjust itself accordingly to operate as fully as possible with the equipment that is available. Some of today's vehicles already have some of the equipment used by this invention built into the vehicle. For example, some more recent vehicles have methods of determining when the vehicle begins drifting out of its lane.

This invention has programming to allow for all the functions of this invention to be executed or run on remote computers or equipment and all functions linked to specific vehicles.

This invention leaves the driving to the driver. This invention does not intervene robotically, mechanically or in any other way with the driver's control of a vehicle. The driver is still responsible for driving. This invention accumulates information (data) on a driver's driving methods and techniques and stores, evaluates and rates them. The intention of this invention is to cause drivers to have incentives, including financial incentives, to drive safer so that the drivers themselves intervene voluntarily on their driving techniques so as to reduce driving risk.

This invention has programming to enable and communicate with robotic, mechanical and other types of driving intervention equipment that may be on a vehicle. This programming is available within this invention but will remain disabled unless enabled by some users. If enable to do so, this invention has the ability to cause available driving intervention equipment on the vehicle to intervene on the subject driver's driving to help prevent death, and collisions if the needed mechanical or robotic equipment needed for intervention is available on the vehicle for programming and use. This capability is limited by the intervention equipment available on the vehicle. Some of today's vehicles already have driving intervention equipment built into the vehicle. For example, some more recent vehicles do intervene by helping to keep the vehicle in its lane if the vehicle begins drifting out of its lane.

Some levels of driving control intervention within this invention if enabled are: allow driving Intervention when Collision is imminent, allow driving intervention if Driving Space Cushion is violated, and allow driving intervention if vehicle is drifting out of its lane unintentionally.

When selected to do so by users, this invention can reduce distractions from driving caused by cell phones by disabling the subject driver's hand held cell phone devise when driving while, at the same time, enabling many of that cell phone's functions or applications through hands free voice activation of the appropriate existing cell phone equipment on the vehicle. Any cell phone application that is considered detrimental to driving safety by this invention is disabled by this invention while driving.

This invention has programming that recognizes instances of Road Rage displayed by drivers or passengers or other drivers. This invention has driver recognition programming using voice recognition and or face recognition or key recognition or whatever recognition methods become available to recognize each driver automatically.

This invention has programming which limits who is authorized to start a particular vehicle. The person must be identified by this invention before allowing the person to start the vehicle thereby eliminating unauthorized persons from starting vehicles. People will no longer need keys. They will be identified by a code or some other means which authorizes them to start their vehicle.

This invention has programming allowing the owner of a vehicle, and certain other users, the ability to shut the vehicle down. Shutdown of any vehicle will not occur while it is in operation but will take affect on next attempt to start the vehicle.

This invention has programming for parental control. Parent as primary driver of a vehicle can assign driving restrictions on other drivers authorized by primary driver to driver their vehicle. This invention has programming to enable voice command for the driver and other users and provides a visual menu of voice commands available.

This invention has optional breathalyzer available for drivers that have been convicted of DUI (driving under influence) or DWI (driving while impaired). Drivers that have been convicted of DUI or DWI will have their DUI or DWI conviction listed in their profile and will not be able to start any vehicle with this invention installed on it unless they have submitted to this invention a satisfactory reading on the optional breathalyzer. If a drivers that have been convicted of DUI or DWI blows a breathalyzer reading equal to or greater than the legal blood alcohol content he or she will not be able to start any vehicle with this invention installed on it. This feature can be enabled or disabled by some users. Or by a court order.

This invention has programming that recognizes when a driver's driving is impaired or fatigued. This invention has programming to allow updates for any methods that may become available to determine the sobriety of a driver. This invention has programming to determine the level of concentration or distraction of a driver.

This invention has programming to record consecutive hours driven by each driver. This invention has programmed safety guidelines for number of consecutive hours driven by each driver. This invention has programming to recognize a driver's observation skills.

This invention has programming to recognize when a driver has poor observation skills by logging the number of each driver's failures to recognize driving hazards in a timely fashion. This invention has programming to automatically analyze the precautions needed for a lane change, or turn that is prompted by turn signal being turned on. This invention has programming for defensive driving actions executed by drivers, without a scoring or rating penalty, to adjust for problems caused by other drivers or objects. For example, when a driver must move out of a lane to adjust for another driver or vehicle moving into his lane or area too closely. This invention assesses no rating or scoring penalty to a driver for abruptly moving out of a lane or doing anything whatsoever as a defensive action to avoid a potential collision or hazard caused by another driver, vehicle or object.

This invention has programming that allows for, without a scoring or rating penalty, a burst of acceleration or even slightly going over the speed limit during appropriate defensive driving scenarios. For example, acceleration while passing a Semi-Truck to cause a negative approach from it when pulling back in front of it during lane change is considered by this invention as a positive driving maneuver as long as the speed used to accomplish the maneuver is not excessive. This invention has programming to allow for sensing of emergency vehicles and alerting drivers of need to yield appropriately including moving over for emergency vehicle or policeman on the side of the road. This invention has programming to recognize toll roads, bridges, express lanes, construction areas, concrete walls, ditches, pillars, posts, guard rails, and many other roadway anomalies.

This invention has programming to warn drivers of blind hills or curves they are approaching and to determine if any other vehicle may be approaching them on a collision course from the other side of any blind hill or curve. This invention has programming to warn drivers of any other vehicle may be approaching them on a collision course from anywhere.

This invention has programming for automation of dimming and brightening of headlights as needed when approaching other vehicles are located by this invention within the appropriate distance from the subject vehicle.

This invention has programming for automatically turning on windshield wipers along with headlights when rain is sensed if enabled by user to do so. Also, if this feature is enabled, windshield wipers are automatically turned off or intermittently reduced or increased as needed.

This invention has programming that monitors the driver's use of turn signals including the failure to use turn signals. This invention has programming to reference is the weight of the vehicle with regard to all the other parameters involved in the programming. This invention has a complete set of parameters and programming regarding pulling trailers. This invention has a complete set of parameters and programming regarding motorcyclists and their motorcycles and their riders. This invention has a complete set of parameters and programming regarding and their bicycles and their riders. This invention has a complete set of parameters and programming regarding equipment. This invention has a complete set of parameters and programming regarding drawn vehicles. This invention has a complete set of parameters and programming regarding their drivers. This invention has a complete set of parameters and programming regarding and nigh-time driving. This invention has a complete set of parameters and programming regarding pedestrians.

This invention has a complete set of parameters and programming regarding any desired transportation modality, includes vehicles, manpowered vehicles, and animals. emergency vehicles. This invention has a complete set of parameters and programming regarding construction areas. This invention has a complete set of parameters and programming regarding driver's reaction to construction areas. This invention has a complete set of parameters and programming regarding weather conditions. This invention has a complete set of parameters and programming regarding driver's reaction to weather conditions. This invention is updateable. Is compatible with all major computer operating systems.

This invention is compatible with various kinds software programs or applications or computer languages found on various vehicles or provided by different manufacturers. This invention has full "voice command" capabilities for users. This invention has language selection capabilities.

This invention has unit selection capabilities. For example, miles per hour versus kilometers and meters versus feet or yards, etc. This invention has programming that allows for the agencies that keep motor vehicle records, such as, the Department of Transportation to work with this invention via the internet to update their records to their liking. They are able to select what they want to get from this invention.

This invention can communicate and coordinate with signals, computers, sensors, cameras and other equipment available at intersections or alongside roadways.

This invention has the capability to publish violations of traffic law done by specific drivers. This feature can be disabled or enabled by some users.

This invention has several different methods or levels of publishing drivers violations of law. This invention has Levels of publishing violations of law can be set or adjusted by certain users. Publishing violations of law can be enabled or disabled by certain users. This invention has programming that constantly records the activity of each vehicle. For example, this feature can help document the circumstances that may have contributed to a traffic accident. This invention constantly monitors and makes a record of all the activity of a vehicle including things such as location, speeds driven, routes driven, aggressive and defensive driving events, space management, driver's braking reactions, location of each vehicle and more. In short, all phases of the driving activity of each vehicle thereby providing a evidentiary record or trail of driving events leading up to a traffic accident.

This invention has programming to allow certain users to completely disable any vehicle that has this invention installed upon it. This invention has programming for the US States to use to administer their driver's license points system which allows each State to assign points for various selected driving events for each individual driver. This invention syncs or communicates with the website allowing adjustment of settings. This invention features a SmartPhone app with many this invention setting adjustments and features accessible to users by smart-phones.

This invention's website syncs with smart-phone This invention app. This invention has programming to allow connection to the internet. This invention has programming to allow communication with this invention installed on other vehicles. This invention has programming to pinpoint the location, speed, and distance of nearby vehicles and other objects using GPS, satellites, sensors, the internet and other methods.

Tracking features. GPS or the "Global Positioning System" and satellites, sensors, the internet and other methods, are used by this invention to pinpoint and confirm the location, speed, and direction of vehicles, pedestrians, and other objects. This invention has the capability to communicate with other vehicles having this invention for information regarding speed, signals, location, direction and much more using satellites, the internet and other methods. Using various technologies (such as sensors, GPS, screens) this invention does extensive collection of information about vehicles (such as location, speed, turning signal) and other things in the area of the subject vehicle to provide the subject driver a scan or picture of activity in the area surrounding the subject vehicle. This invention Provides warnings to drivers that are approaching dangerous situations.

Tracking features with turn signal and other indications. This invention has programming that memorizes pertinent information about routes driven including route numbers and street names, lane widths, speed limits, etc. This invention has programming that uses technologies (such as Google Maps) to obtain information pertinent to the route selected such as Posted Speed Limits and much more. This invention is programmed to alert the subject driver about turn or brake signals operating on nearby vehicles. For example, signals that are on vehicles that are attempting to enter traffic turn left from an opposing lane. This invention is programmed to be in communication with any pertinent equipment on other vehicles. This invention transmits its own location, speed, signals, and receives same from other vehicles equipped with this invention. This invention has accessory equipment for installation on other vehicles to enable communication with the subject vehicle of location, speed, signals, etcetera of the other vehicles.

This invention has communication equipment available for installation at various roadside anomalies such as construction areas, red lights, pedestrian crossing lights, rails, pillars, etc. than can transmit signals for this invention to recognize. This invention has programming for a Virtual Driving Space Cushion Screen showing subject vehicle and everything else nearby such as vehicles, pedestrians, walls, rails, etc. This Virtual Driving Space Cushion Screen can be run on an existing video screen on the vehicle or can be installed onto the vehicle.

The vehicle system accommodates new drivers and includes driver training features. This invention provides rating and scoring of new drivers thereby giving the US States a new and much better and much less expensive method of testing or evaluating and qualifying new drivers for driver licensing. Driver Scoring or rating parameters can be adjusted by each U.S. State allowing them to implement their preferred requirements for evaluation and qualification of new drivers. The State authorities can enter into this invention their specific qualifications required for "new" driver scoring.

Weighting or significances of driving skill and techniques used by new drivers can be adjusted by each U.S. State depending on their preferred requirements for evaluation and qualification of new drivers. This invention has programming to recognize when drivers have poor observation skills.

This invention has programming that will display for analysis of the driver's last trip showing all the positive and negative driving methods or techniques they used while on their last trip. This invention has programming that will display for an analysis of the driver's driving methods or techniques they used during any period selected.

Portions of the driver and vehicle rating and data is available to drivers on the internet through their website profile account to allow drivers the opportunity for self improvement of their driving and their Personal Driving Score. This invention includes user friendly self training programming and applications to help drivers learn to comply with risk-reducing driving techniques to improve their driving and their Personal Driving Score.

This invention includes a cell phone app the works in conjunction with this invention for the self training features. This invention can (optional) make suggestions, using display screens or audio equipment, to drivers on how they can improve their driving and ratings or scores and reduce their risk of driving the vehicle.

This invention has attempts to teach drivers that . . . . Aggressive driving has very little or no benefit. The reward does not justify the risk. Any time gained by driving aggressively is negligible. Aggressive driving dramatically increases a driver's risk of being killed or injured. Aggressive driving dramatically increases everyone's risk of being killed or injured. Aggressive driving increases passengers risk of being killed or injured. Aggressive driving is dangerous. Aggressive driving is caused by a driver's attitude. There is no good reason for aggressive driving. Aggressive driving is not logical. Aggressive driving is not very smart. A high percentage of drivers drive aggressively. Aggressive driving must be reduced. There is no benefit or good reason for aggressive driving.

This invention includes a tutorial for the drivers that explains the benefits of their involvement with this invention such as fewer traffic jams, less danger, less risk of death injury or property damage, fuel savings, etc. This invention has programming to help train drivers on the basic maneuvers taught in the driving school such as parallel parking and three-point turnabout, etc.

The vehicle system also includes driver admonishment features. If enabled by some users, this invention admonishes drivers, at different levels, and in different ways as selected by users for various driving events such as violations of safety like following distance of less than 3 seconds (from the vehicle in front) or entering traffic with oncoming approaching traffic to close for safe entry etc. Driver Admonishments can be enabled or disabled by some users. This invention has several levels of driver admonishment for many driving scenarios. Levels of driver admonishment for driving scenarios can be set or adjusted by various users. This invention has programming to allow insurance companies to indicate or quote to drivers differing levels of insurance premiums based on which levels of admonishment are selected by drivers for use in their vehicle.

This invention has pre-programmed levels or tiers of admonishment available for selection by some users. This invention allows some users to increase or decrease levels of admonishment for driver's safety violations.

Has standard or recommended levels or tiers of admonishment programmed in for all driving factors or all actions evaluated by this invention.

Levels or tiers of admonishment within this invention are affected by levels of risk created by drivers. For example, when a driver proves to habitually poorly manage the Driving Space Cushion this invention increases the level or tier of admonishment for that driver.

Examples of levels of admonishment: Level A, short driver seat vibration for following distance less than 3 second distance, longer driver seat vibration for following distance less than 2.5 seconds, chimes for following distance less than 1.5 seconds. Level B, a buzzer for following distance less than 3 second distance, a buzzer for following distance less than 2.5 seconds, a buzzer for following distance less than 1.5 seconds, and buzzers are each one a little more irritating than the previous. Level C, increasingly annoying alerts as the driver's safety violations become increasingly worse. More Levels of Admonishment: alerts become more powerful or harsh as driver's safety violations become increasingly worse.

The terms "weighting or significance" is defined as the significance of the factors considered by this invention for Driver Scoring and Vehicle Scoring. This invention allows adjustment of weighting or significance of driver scoring and vehicle scoring parameters by some users. Each category of users has different levels of ability to adjust or set weighting or significance of driver scoring and vehicle scoring parameters.

This invention allows some users to set weighting or significances for Driver Scoring and driver admonishment for all driving factors individually. This invention allows some users to set weighting or significances for Driver Scoring and driver admonishment for different kinds vehicles such as automobiles or trucks.

This invention has pre-programmed levels of weighting or significance for Driver Scoring and driver admonishment that can be selected by some users. For example, this invention has and can use different levels of weighting or significance on Driver Scoring and driver admonishment based on which following distance (3, 3.5, 4, 4.5 and 5 second following distance from the vehicle in front) is selected by a user.

The vehicle system outputs its evaluations to one or more websites and/or user devices. All accumulated data and ratings and scores on each driver and each vehicle are published and made available to various users by this invention, at different levels, by means of the internet and by other methods. This invention continues to collect and store driving data when there is no internet connection then publishes the driving data whenever connections become available. This invention makes the subject driver's driving data and scores available to the public. In addition the subject driver's driving data and scores will be available to the subject driver along with ways for him or her to improve their Personal Driving Score. This invention has the capability to publish violations of traffic law done by specific drivers. This feature can be disabled or enabled by some users.

Websites. This invention is associated with websites where users can access Driver Scores, Vehicle Risk Scores, each driver's driving history records and data, each vehicles history records and data, register their website profile accounts, and much more.

User Website Profile Accounts. Each user can register website profile accounts and assign themselves usernames and passwords. There will be a website profile account for all users including each vehicle and each driver.

Driver Website Profile Accounts. This invention makes a website profile account on each driver for the purpose of accumulating driving history data on each driver. Driving history data for each driver is kept separate from the data on the vehicle. Each driver registered user will have a user name, and password, and an ID number. Users have access to the website profile accounts via the invention's website (s).

Portions of each user's website profile account are private and other areas of the website profile accounts are public. Users have a full range of options available to them within their website profile account. A separate website profile account containing accumulated driving history data shall be kept on each driver. Drivers can register themselves through their website profile account as the driver of each specific vehicle they drive as they change from vehicle to vehicle. Drivers website profile account includes drivers motor vehicle record or MVR. Each subject driver can register any vehicle they drive within his or her website profile account.

This invention has programming to recognize any driver in a vehicle using voice recognition or face recognition or whatever recognition methods become available to recognize, identify and associate each driver automatically. In addition each driver's key to the vehicle can be used by this invention to help identify each driver. This invention also has programming to compare the accuracy of each identification so as to avoid false identities.

Vehicle Website Profile Accounts. Each vehicle that has this invention installed has a website profile account that is identified by the vehicle's Vehicle Identification Number (VIN) and by user name and password. This invention uploads records of accumulated, driving risk data to the website profile account about the entire life of each vehicle. A separate website profile account containing accumulated driving history data shall be kept on each driver. This invention references US State Vehicle Registration information, numbers and codes so as to relate the level of risk that that vehicle has produced while registered to each particular owner thereby providing separate chapters of accumulated assessed and rated driving history data created during each of the vehicle's different periods of ownership.

The State Registration of vehicles are incorporated into vehicle profiles within this invention. Change of ownership of a vehicle is a significant point with regard to history records stored in each vehicle's profile. New owners are not penalized or receive better rates due to the previous owner's driving history. When a vehicle changes ownership most of the data produced while under previous ownership is made irrelevant to current scoring or rating of that vehicle. Each vehicle's profile shall have chapters that contain the info on that vehicle as produced during each period of ownership. Each new vehicle has its website profile account registered and uploaded to the internet hosting server. Users have access to vehicle website profile accounts via a website.

Archiving Features. This invention can use a hosting services or server locations where website profile accounts for users, vehicles and drivers are created and stored. Users will be able to access their website profile accounts for a number of uses. Data for the website profile accounts on all vehicles and drivers is automatically uploaded by this invention to the hosting server. Insurance companies will be able to access their website profile accounts so they will always have current information available on vehicles and drivers.

Introduction and Acclimation Features. This invention has programming designed to introduce and acclimate people to this invention so as to improve people's likelihood to use it effectively.

Tolerance Features. This invention allows for appropriate Government agencies to set tolerances on the Violations of Traffic Laws published by this invention. Some examples of tolerances that are programmed into this invention are: When a vehicle pulls into a driver's space cushion. There will be no rating or scoring penalty against the subject driver in this situation because the reduction in following distance was created by another driver. However, this invention will record the subject driver's reaction to this situation.

When executing defensive actions such as drifting out of a lane to adjust for a driver or vehicle coming too close. There should be no rating or scoring penalty against the subject driver for drifting out of a lane or doing most anything whatever as a defensive action to avoid a collision made inevitable by another driver or vehicle. When changing lanes and pulling in too close to the vehicle in front in the new lane. There will be no rating or scoring penalty against the subject driver if the subject driver then immediately adjusts for the Driving Space Cushion by braking enough to create a sufficient following distance. Tolerance for lane changes needed for lane ending situations of construction areas. Tolerances set by law enforcement agencies. For example the State Police may want to set speed limit violation tolerances based on the amount of speed driven above the posted speed limit. Tolerances set regarding which events or how often a driver exhibits things that indicate his or her driving is impaired or fatigued. Tolerances may be set at different levels by some users based on where the vehicle is. For example there may be more or less tolerance for driving methods used on interstate highways as opposed to driving methods used in residential neighborhoods.

This invention has programming which includes extensive detailed information about most each and every driving situation or scenario that may be encountered by someone driving a vehicle which is used by this invention to monitor and evaluate risk created by drivers. Currently, some drivers sometimes increase the risk of death, injury or property damage for other drivers without any consequence. Previously, there have been thousands of instances where increased driving risk (wreck-less driving) created by a driver has caused the death or injury of innocent people.

This invention helps make unsafe or aggressive drivers more personally and financially responsible for most all instances of risk they create for themselves and others by constantly monitoring, rating and instantly publishing, via the internet, all aspects of their driving methods and characteristics or techniques.

This invention constantly and instantly exposes to everyone most all instances of unsafe or aggressive driving. This invention constantly recognizes and instantly publishes, via the internet, in real time, instances of drivers driving while impaired or fatigued (DUI). This invention learns and makes a record and evaluation of driver's habits. This invention has programming that significantly reduces the chances of traffic accidents occurring including the deadly and expensive chain reaction accidents that happen every day on our roadways. This invention provides advance warnings of eminent dangerous situations.

This invention also features a driving risk gauge or meter that uses its accumulated driving history data about drivers to continuously display and instantly publish, via the internet, in real time, the vehicle's and the driver's measurements of driving risk. This invention learns drivers habits and uses said "knowledge" about drivers habits to perform this inventions functions.

Also, as an option, if selected by some users, this invention can make enforcement of traffic laws much easier and less expensive because it constantly and instantly exposes each driver's traffic law violation(s), via the internet, as compared to, physically monitoring roadways with expensive police officers in police cars. Drivers will be aware of the constant publication of their traffic law violations making drivers more inclined to obey traffic laws constantly instead of only when there is a police officer watching or present. This invention makes it much harder for drivers to ignore traffic laws. Also, this will free up time for police officers to be spent on higher priority crimes.

This invention provides an evidentiary record of all driving history regarding vehicles and drivers including driving history leading up to a traffic accident. This invention can effectively test and qualify or disqualify new drivers. This invention can train people to drive better. This invention does not infringe on American Freedoms. If this invention is adopted drivers will still be free to drive in whatever way they want. There are already laws against unsafe driving. Drivers are already being monitored. This invention just does it better and more consistently. This invention features programming to gradually acclimate the general public to its use so as to improve societies acceptance and usage of it.

This invention will be developed by computer software programmers or engineers using the information and descriptions herein. There will be thousands of computer programming statements and commands involved to perform this inventions functions. For example: For drivers that constantly drive aggressively there will be "IF-THEN" computer language statements that indicate something like the following: IF subject driver executes an aggressive driving maneuver THEN record that event in the subject driver's driving history data as aggressive. Or another example is: IF subject driver follows another vehicle within 30 feet of the vehicle in front of him at 60 miles per hour three times THEN record that event in the driver's driving history data as very aggressive and classify and record that event in the subject driver's driving history data as habitual.

Referring to FIG. 1, the system includes equipment on board vehicles such as antennas, sensors, Global Positioning System equipment, satellite discs, radar, sonar, transmitters, transponders, receivers, radios, along with any other new or pertinent equipment or technology that is available or may become available, are used by this invention to connect to the internet.

This invention is designed and programmed to receive information from and operate in communication with satellites. Equipment on board vehicles such as antennas, sensors, Global Positioning System equipment, satellite discs, radar, sonar, transmitters, transponders, receivers, radios, along with any other new or pertinent equipment or technology that is available or may become available, are used by this invention to connect to satellites.

This invention is designed and programmed to receive information from and operate in communication with Global Positioning System equipment.

This invention is designed and programmed to receive information from and operate in sync or in conjunction, or communication with control systems on vehicles such as, computers, processors, turn signals, brake signals, tracking devises, steering equipment, control panels, braking and accelerating equipment, batteries, etcetera, along with any other new or pertinent equipment or technology that is available or may become available that may be useful to this invention.

This invention has programming to enable and communicate with robotic, mechanical and other types of driving intervention equipment that may be on a vehicle. This programming is available within this invention but will remain disabled unless enabled by some users. If enable to do so by certain users, this invention has the ability to cause available driving intervention equipment on the vehicle to intervene on the subject driver's driving to help prevent death, and collisions if the needed mechanical or robotic equipment needed for intervention is available on the vehicle for programming and use. This capability is limited by the intervention equipment available on the vehicle. Some of today's vehicles already have driving intervention equipment built into the vehicle. For example, some more recent vehicles do intervene by helping to keep the vehicle in its lane if the vehicle begins drifting out of its lane.

Some levels of driving control intervention within this invention if enabled by a user are: allow driving Intervention when Collision is imminent, allow driving intervention if Driving Space Cushion is violated, and allow driving intervention if vehicle is drifting out of its lane unintentionally.

This invention is designed and programmed to receive information from and operate in sync or in conjunction, or communication with other on board systems on vehicles such as, sensors, Global Positioning System equipment, satellites, radar, sonar, transmitters, transponders, receivers, radios, turn signals, brake signals, tracking devises, batteries, etcetera, along with any other new or pertinent equipment or technology that is available or may become available that may be useful to this invention.

This invention is designed and programmed to publish the information it accumulates on the internet. Users are able to get information accumulated by this invention from the internet.

This invention is designed and programmed to be updated as needed and to take full advantage of any new or pertinent equipment or technology that is available or may become available that may be useful to this invention.

This invention is designed and programmed to receive information from and operate in sync or in conjunction, or communication with other systems along with any other new or pertinent equipment or technology that is available or may become available that may be useful information to this invention.

This invention is designed and programmed to receive information from and operate in sync or in conjunction, or communication with other on board systems on vehicles such as, transmitters, transponders, receivers, radios, turn signals, brake signals, tracking devises, etcetera, along with any other new or pertinent equipment or technology that is available or may become available that may be useful to this invention.

The system uses many devises to analyze, evaluate, and assess data it accumulates on the driving techniques, methods, characteristics, and established habits used by individual drivers of specific vehicles when driving to determine the amount of driving risk created by each driver and each vehicle by comparing their driving history data to safe driving parameters within this software as selected by various users.

The system can monitor, evaluate, and update the risk meter based upon certain maneuvers of the vehicle and/or driver, including vehicle space management (FIG. 4), turns, approaches to intersections (or stop signs), and other maneuvers.

For example, the system can evaluate a left turn by a driver. In an exemplary driving scenario, the subject driver may execute a left turn, while another vehicle is approaching from the left at 40 mph. The other vehicle is within 90 ft of the subject driver. Hence, the subject driver is turning in front of oncoming traffic. The system will rate this driving event as dangerous and/or aggressive, and drop the subject driver's score by 5%. The system will archive the driving event in the archive database. Then, the system will adjust the rating on the risk meter by the corresponding 5% decrease calculated by the system. The system will also drop the vehicle score by 5%. If the subject driver repeats such a turning maneuver three or more times within a twenty-four hour period (within 24 hours of driving), then then the system may store the event(s) in a driving habits data archive. After another such maneuver, the system may accordingly reevaluate the driver's and/or vehicle's score, store such in the database, and update the risk meter.

In another exemplary driving scenario, the subject driver may execute a right turn, while another vehicle is approaching from the left at 40 mph and within 400 ft of the subject driver. Hence, the subject driver has left ample space between the oncoming vehicle, avoiding any potential incident. In such a scenario, the system will rate this driving event as excellent and/or defensive and will then raise the subject driver's score by 2%. The system will archive the driving event in the archive database. Then, the system will adjust the rating on the risk meter by the corresponding 2% increase calculated by the system. The system will also raise the vehicle score by 2%. If the subject driver repeats such a turning maneuver three or more times within a twenty-four hour period (within 24 hours of driving), then then the system may store the event(s) in the driving habits data archive.

In another exemplary driving scenario, the system may evaluate the driver whilst the driver is traveling in traffic, monitoring the vehicle space cushion that the subject driver is providing to other vehicles in the driver's proximity. In the present example, the subject vehicle is following the preceding vehicle at 40 mph and within 200 ft. Hence, the subject driver has left ample vehicle space between the vehicles. The system will rate this driving event as good and/or defensive and will then raise the subject driver's score by 2%. The system will archive the driving event in the archive database. Then, the system will adjust the rating on the risk meter by the corresponding 2% increase calculated by the system. The system will also raise the vehicle score by 2%. If the subject driver repeats such a turning maneuver three or more times within a twenty-four hour period (within 24 hours of driving), then then the system may store the event(s) in the driving habits data archive.

This invention uses many devises to analyze, evaluate, and assess data it accumulates on the driving techniques, methods, characteristics, and established habits used by individual drivers of specific vehicles when driving to determine the amount of driving risk created by each driver and each vehicle by comparing their driving history data to safe driving parameters within this software as selected by various users. Obviously, there are many driving maneuvers performed by drivers. This invention has programming regarding all driving maneuvers performed by drivers.

This invention operates on remote computers in addition to computers on vehicles. This invention is designed and programmed to remotely (on remote computers) receive information from and operate in sync or in conjunction, or communication with other on board systems on vehicles such as, computers, processors, gauges, speedometers, odometers, sensors, Global Positioning System equipment, satellites, radar, sonar, transmitters, transponders, receivers, radios, turn signals, brake signals, tracking devises, steering equipment, display screens, control panels, braking and accelerating equipment, batteries, etcetera, along with any other new or pertinent equipment or technology that is available or may become available or any other means capable of delivering useful information to this invention.

This invention uses multiple methods of location of and or communication with (such as sensors, Global Positioning System equipment, satellites, radar, sonar, transmitters, transponders, receivers, radios, along with any other new or pertinent equipment or technology that is available or may become available or any other means capable of delivering useful information to this invention) vehicles that do or do not have this invention installed on board the vehicle thereby enabling this invention to do many of its functions regarding vehicles that do or do not have this invention installed upon them.

This invention receives vital information pertaining to the location, speed, and distance, direction and other pertinent information regarding vehicles and other objects in order to perform its functions. This invention has programming to allow for all the functions of this invention to be executed or run on remote computers or equipment and all functions linked to specific vehicles.

Some users can select tolerances for driving events, scenarios, maneuvers, methods, etc. For example Law Enforcement agencies may want to allow a certain number of miles per hour over a Speed Limit to be tolerated thereby instructing this invention to take no action or a selected action if the driver's action is within the tolerance allowed.

Thus, although there have been described particular embodiments of the invention it is not intended that such references be construed as limitations upon the scope of this invention except as set forth in the following claims.

The invention claimed is:

1. A vehicle system comprising:
a vehicle configured to be driven by a driver;
a remote computer comprising one or more memories storing computer executable instructions and one or more processors that, when executing the computer executable instructions, are configured to:
receive driver data sensed from one or more sensors on the vehicle;
generate a driver score based on the sensed data, the driver score indicating a driving history of one or more driving behaviors of the driver in one or more driving maneuvers;
generate a risk meter based on the driver score;
update the risk meter based upon a present driving behavior; and
output the risk meter to the driver and to a remote server, thereby publishing the risk meter so that the risk meter is viewable by the driver and other drivers in real time and responsive to the driving history and the present driving behavior, wherein the one or more processors are further configured to:
rate a cross traffic turn as aggressive wherein the driver turns within 90 feet of an oncoming vehicle;
reduce the driver score by five percent;
reduce a vehicle score by five percent; and
adjust the risk meter responsive to the reduced driver score.

2. The vehicle system of claim 1, wherein the risk meter comprises a graphical meter indicating an accumulated driving behavior of the driver.

3. The vehicle system of claim 1, wherein the one or more processors are further configured to generate a driver profile and a vehicle profile.

4. The vehicle system of claim 1, wherein the vehicle comprises a computer, a GPS sensor, and a display.

5. The vehicle system of claim 4, wherein the one or more processors are further configured to output the risk meter to the vehicle, causing the display of the vehicle to display the risk meter to the driver.

6. The vehicle system of claim 1, wherein the one or more processors are configured to update the driver score by adding or subtracting percentage points based on the one or more driving behaviors.

7. The vehicle system of claim 1, wherein the present driving behavior includes a driving space cushion between the vehicle of the driver and another vehicle in front of the vehicle such that the risk meter is updated and outputted to the driver in real time responsive to the driving space cushion.

8. The vehicle system of claim 1, wherein updating the risk meter includes increasing or decreasing a measurement of driving risk responsive to the present driving behavior in real time.

9. The vehicle system of claim 1, wherein the risk meter includes a measurement of driving risk along with a measurement of increase or decrease of driving risk.

10. The vehicle system of claim 1, wherein the one or more processors are further configured to admonish the driver using one or more admonishments including a driver seat vibration, a chime, and a buzzer.

11. The vehicle system of claim 1, wherein the one or more processors are configured to analyze and notify the driver about a safe maneuver including a lane change or a turn of the vehicle.

12. The vehicle system of claim 1, wherein updating the risk meter based upon the present driving behavior includes updating the risk meter based upon vehicle space management, a turn, and an approach to an intersection.

13. The vehicle system of claim 1, wherein the driver is a new driver in training, and the one or more processors are further configured to evaluate, test, and qualify or disqualify the new driver.

14. The vehicle system of claim 1, wherein the risk meter is configured to display:
a measurement of driving risk of the vehicle;
a vehicle risk score of the vehicle based on vehicle history;
a vehicle history analysis of the vehicle risk score;
a history analysis of the driver score;
a driver habit score;
a history analysis of the driver habit score;
an average driving risk of the driver as accumulated over a period of time;
an indicator of a defensive or an aggressive driving behavior;
a violation of a traffic law committed by the driver; and
a sobriety level of the driver.

* * * * *